June 5, 1934.  A. B. SEVERN  1,961,794

SIDE BEARING

Filed Jan. 11, 1933

WITNESSES

INVENTOR

Patented June 5, 1934

1,961,794

UNITED STATES PATENT OFFICE 1,961,794

SIDE BEARING

Arthur B. Severn, Pittsburgh, Pa., assignor to A. Stucki, Pittsburgh, Pa.

Application January 11, 1933, Serial No. 651,155

4 Claims. (Cl. 308—226)

This invention relates to side bearings for railway cars, and has for its primary object the provision of an antifriction side bearing of the roller type employing a novel and improved form of construction for locking the anti-friction roller of the bearing in the cage thereof to prevent it from being dislodged in normal service or in case of wrecks or other abnormal conditions.

Another object is to provide a side bearing of this character which is simple and sturdy of construction, easy to assemble and inspect, and at the same time durable in service and inexpensive to maintain.

Figure 1:
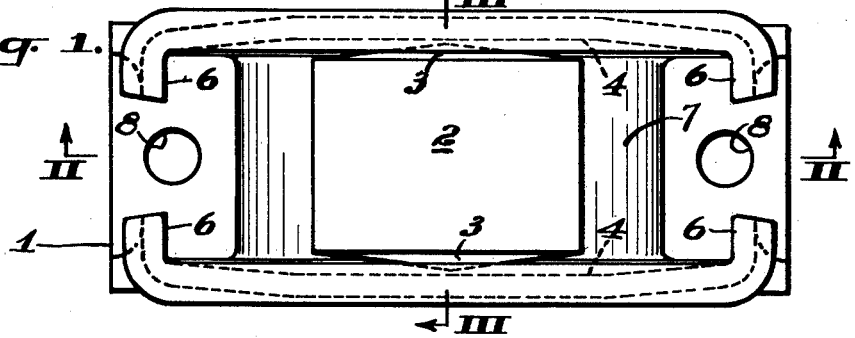
Figure 2:
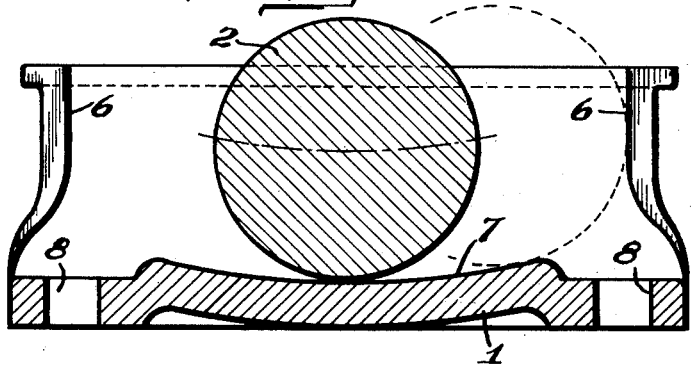
Figure 3:
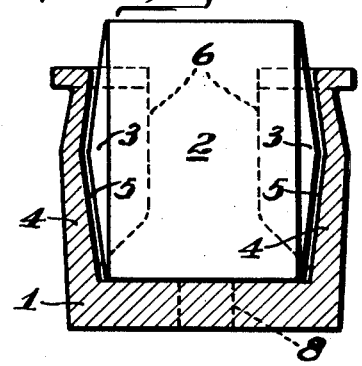

These and various other objects, as well as the various other novel features and advantages of the invention, will be apparent when the following detailed description is read in conjunction with the accompanying drawing, of which Fig. 1 is a plan view of a side bearing assembly constructed in accordance with the invention; Fig. 2 a longitudinal vertical section taken on the line II—II of Fig. 1; Fig. 3 a transverse sectional view taken on the line III—III of Fig. 1; and Fig. 4 a sectional view similar to Fig. 3 of a modification of the invention.

As illustrated in Figs. 1, 2 and 3 of the drawing, a side bearing assembly is provided which comprises merely a housing or cage 1 and an anti-friction roller 2. In accordance with this invention these are so constructed that the roller is easy to assemble, but once in place it is positively locked in the housing in such a way that it is prevented from becoming dislodged either in normal or abnormal service which is a feature that is highly desirable in such bearings. As illustrated in the drawing this result is obtained by providing the roller with cone-shaped ends 3 and the cage with correspondingly shaped grooves 5 in the side walls 4 thereof in which these ends 3 are adapted to move.

To provide for placing the roller in the cage its side walls 4 are made sufficiently resilient to permit the roller to be simply forced between them and cause them to return to their normal position as soon as the roller is in place, and hence hold the roller in place. As will be appreciated the ends of the roller when so shaped will function as wedging surfaces to facilitate the assembly.

It is contemplated that the cage 1 may be made in various ways, such as by forging or casting, but preferably it is formed of rolled or pressed steel in the shape of an open-ended channel the side walls of which are cut on an angle at their ends and turned inwardly to form stops 6 which prevent the roll moving out of the ends of the cage. To prevent any dirt collecting in the cage and to also adapt it to be readily inspected the openings between the stops 6 are made sufficiently large so that the roller is in plain view and the dirt can pass freely from the cage.

In order that the roller 2 will automatically return to the center of the cage whenever the upper bolster is lifted away from it a curved pocket-like bearing surface or roller seat 7 is provided in the bottom of the cage and preferably comprises the bottom of the cage itself, as illustrated. To facilitate the movement of the roller the offsets or grooves 5 in the sides 4 of the cage are curved similar to the upper surface of the roller seat 7 as indicated in Fig. 2, although they may be made straight with sufficient depth to allow for the vertical movement of the roll caused by the curvature of the roller seat, if desired.

To adapt the roller 2 to move freely in the cage and minimize any tendency it may have for shifting on the bearing surface thereof it is made sufficiently long so that it will not get out of alignment, while for attaching the cage to the car bolster holes 8 are provided in its bottom wall between the ends of the seat 7 and the ends of the cage.

Figure 4:
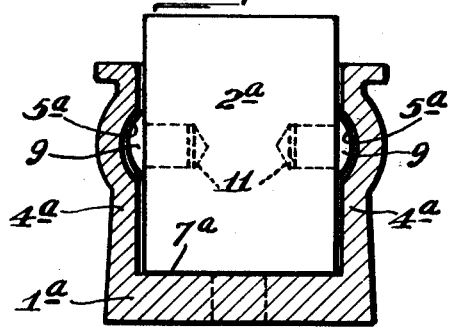

In a modification of the invention illustrated in Fig. 4, a roller 2a is employed which has flat ends, but in these round headed pins 9 are provided to lock the roller in the cage 1a, the pins being secured in holes 11 drilled in the center of the rolls. For this form of construction curved grooves 5a shaped more according to the heads of the pins are provided in the sides 4a of the cage for the heads of the pins to run in. As shown, these grooves are made with sufficient width to allow for the vertical displacement of the roller as it moves over the curved seat 7a in the base of the cage, and hence they may be run parallel to the top of the cage, although they may be made narrower and curved, as shown in Fig. 2.

In this latter assembly, as in the one previously described, the cage is provided with resilient sides and the roller is sprung into place, and in view of it, it will be readily appreciated by those skilled in the art that the locking centers provided on the ends of the roller may be formed in numerous ways and in various shapes and may be either turned, riveted or welded onto the roller.

Among the outstanding advantages of side bearings embodying this invention are their simplicity of construction and ease of assembly.

According to the provisions of the patent statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. A side bearing comprising a roller housing provided with substantially vertically disposed resilient side walls in each of which a longitudinal groove is formed, and a roller provided with end projections mounted in said housing with said end projections disposed to run in said grooves and lock the roller in the housing, the side walls being formed of resilient material and adapted to permit the roller to be forced between them and to return to their original positions after the roller is in place, and the end projections on the roller so shaped as to function as wedges when the roller is being forced into the cage between the side walls.

2. A side bearing comprising a roller housing provided with resilient side walls in which longitudinal grooves are formed, and a roller provided with tapered ends mounted in said housing with said ends disposed to run in said grooves and lock the roller in the housing, the side walls being sufficiently resilient to allow the roller to be forced into position between them, and to return to their original positions after the roller is in place.

3. A side bearing comprising a roller housing provided with substantially vertically disposed resilient side walls and a curved bottom, and a roller provided with trunnion-like projections on its ends mounted in said housing with said end projections arranged to run in longitudinal grooves provided in said side walls, said grooves being adapted to lock the roller in the housing and so formed as to permit the roller to roll with freedom on said curved bottom, and the side walls made with sufficient resiliency to permit the roller to be forced into position between them and to return to their original positions after the roller is in place in the cage.

4. A side bearing comprising a roller housing provided with a bottom wall, open ends and substantially vertically disposed resilient side walls in each of which latter a longitudinal groove is formed which terminates between the ends thereof, a roller mounted in said housing to roll on said bottom wall, and trunnion-like projections provided on the ends of said roller and adapted to run in said side wall grooves and lock said roller in the housing, the side walls being provided with sufficient resiliency to permit the roller to be forced into position between them from the top of the cage without permanently altering their original shape.

ARTHUR B. SEVERN.